Dec. 29, 1953     V. S. ANDERSON     2,663,902
MEANS FOR STRIPPING RUBBER ARTICLES FROM A CORE
Filed Feb. 20, 1951
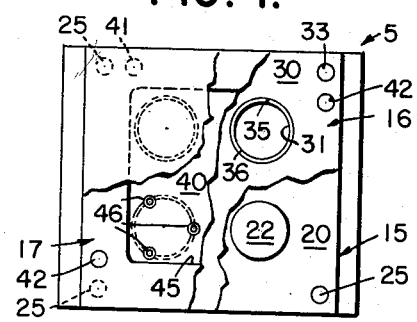
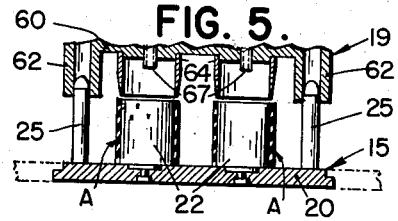
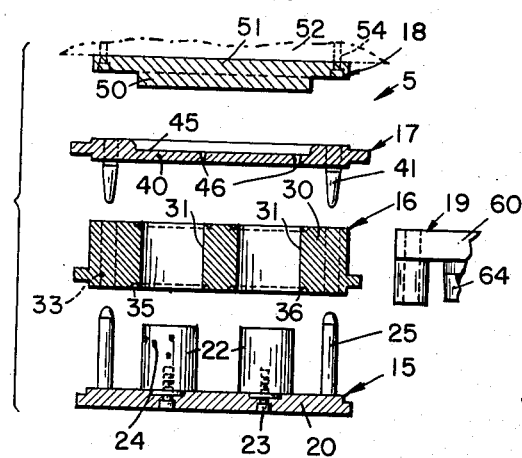
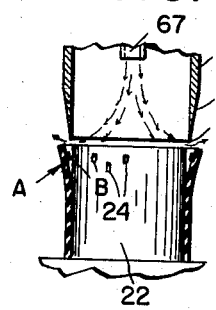
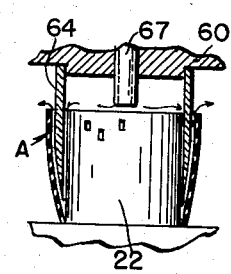
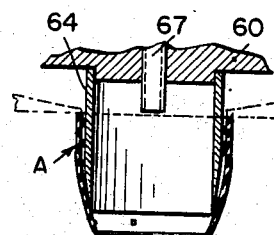
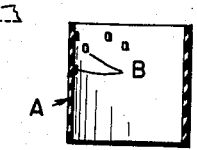
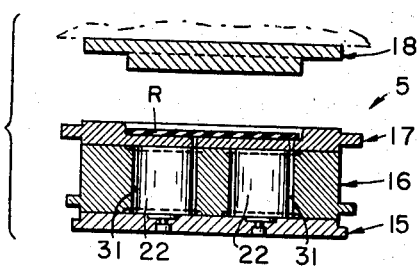
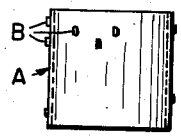
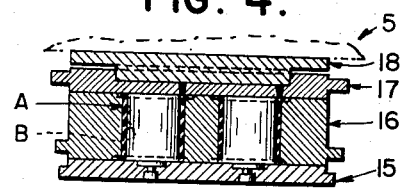
INVENTOR
VOLNEY S. ANDERSON
BY
*Mason & Graham*
ATTORNEYS Patented Dec. 29, 1953

2,663,902

UNITED STATES PATENT OFFICE 2,663,902

MEANS FOR STRIPPING RUBBER ARTICLES FROM A CORE

Volney S. Anderson, Los Angeles, Calif.

Application February 20, 1951, Serial No. 211,922

3 Claims. (Cl. 18—2)

This invention has to do with the molding of articles from rubber and rubber-like compositions as well as the stripping of the molded articles from the mold.

In the molding of tubular or sleeve-like rubber articles, considerable difficulty has been experienced not only in getting an even distribution of the rubber in the cavity between the core and cavity wall, but also in stripping the molded articles from the core after the mold elements are separated. It is to the overcoming of those difficulties that my invention is principally directed, it being an object to provide a mold for manufacturing rubber-like articles.

It is a further object of the invention to provide in conjunction with such a mold efficient means for stripping the molded article from the mold.

Other more or less subordinate objects and advantages will appear hereinafter.

Without intending thereby to limit the broader scope of the invention as defined by the accompanying claims, I shall now describe particular presently preferred apparatus and procedure for carrying out my invention, for which purpose I shall refer to the accompanying drawings, wherein:

Fig. 1 is a top plan view;

Fig. 2 is a medial vertical section showing the elements separated;

Fig. 3 is a view showing the male and female mold elements in molding position and shown partly in section and showing the plunger element in section;

Fig. 4 shows all the parts of Fig. 3 when pressed together in molding position;

Fig. 5 is a view, partly in section and partly in elevation, showing the stripper element in position for operation to remove molded articles from the core elements;

Fig. 6 is an enlarged view, partly in section and partly in elevation, illustrating a stripper member at the commencement of its stripping operation;

Figs. 7 and 8 are views similar to Fig. 6 but showing a stripper member in further progressive steps of a stripping operation;

Fig. 9 is a section of a sleeve-like molded article in the position which it occupies when removed from the stripper member; and Fig. 10 shows the article of Fig. 9 after it has been reversed inside for outside.

Referring now to the drawings, I show generally at 5 the mold and stripping assembly comprising a core element 15, a cavity block element 16, a cover element 17 for the cavity block, a piston element 18 and a stripping element 19.

The core element 15 comprises a base plate 20 to which a plurality of cores 22 are fixed, as by screws 23. It will be understood, of course, that, if desired, the cores may be made integral with the base plate.

As here particularly shown, each of the cores is designed to form a rubber, sleeve-like item A, each as is used in a toy music box, each core having in its periphery a plurality of cavities 24 to form picking fingers on the item. Such an item is shown in Fig. 10 in finished state. Of course, the mold may be used for making various articles and the particular construction described is merely for illustrative purposes. Upright guide pins 25 are provided on the base plate for insertion in guide bores provided in the cavity block 16, which will be described.

The cavity block 16 comprises a body 30 having cavities 31 to receive the cores 22 with sufficient peripheral clearance to allow proper space for forming the article A, which has peripheral projections B, the latter being formed in the cavities 24. Guide bores 33 are provided in the body to receive the guide pins 25 for holding the parts in proper assembly. It is my preference to provide in the bottom surface of the body 30, around each of the cavities 31, an annular groove 35 separated from the cavity by a sharp shearing edge 36. The purposes of this groove and shearing edge are so that the groove receives the flash and the sharp edge shears the flash from the article.

Cover element 17 comprises a body or plate 40 having depending guide pins 41 for insertion in holes 42 in the cavity block, and has an upwardly opening recess 45 to provide a receptacle for a sheet of molding rubber or the like R. Extrusion holes 46 are provided through the plate, there being at least one of said holes disposed to discharge into each space between the periphery of a core member 22 and the surrounding cavity wall.

Referring now to element 18, it comprises a plunger 50 shaped to snugly fit in the cavity 45, the plunger being carried by a plate 51 which is secured to a suitable portion 52 of a molding press (not shown) as by screws 54.

In operation, the parts 15—18 are placed in superimposed relation in a molding press (not shown) and subjected to appropriate heat and pressure. The plunger 50 is thus forced into the recess 45 to displace all the rubber in the recess and thus extrude it downwardly through the holes 46 into the forming elements before described. In this manner, the rubber is caused to fill the space between the cores 22 and the cavity side walls, thus forming the article A about the cores. Any flash flowing into the grooves 35 is severed by the shearing edges 36. One of the principal difficulties heretofore experienced in the molding of such articles has been that of stripping the articles from the cores. The practice has been to insert a pin or other suitable small object between the formed article and the core and then working the object around the core to loosen the article therefrom, after which the article is manually pulled from the core. However, unless the article has sufficiently cooled to insure that its molecular structure is such as to withstand substantial stretching, this removing operation often damages or destroys the molded article. On the other hand, to allow the core and its carried article to cool, increases the period between shots and thus materially slows down the molding operation.

My invention therefore includes the novel and highly efficient stripping means generally designated 19, comprising a base plate 60 carried by a suitable raising and lowering mechanism, such as an elevator (not shown). Depending guide sleeves 62 are carried by the plate in position to register with and receive the guide pins 25 of element 15. Also, a plurality of stripper sleeves 64 are carried by and depend from the plate 60 in such arrangement as to register with and engage over the respective cores 22. As best shown in Figs. 5-8, each of the stripper sleeves is cylindrical through a greater portion of its length but tapers from the cylindrical portion to its bottom end as shown at 65, terminating in a relatively sharp bottom edge portion 66. Air injection nozzles 67 are mounted in the plate 60 in position to discharge a stream of compressed air axially of each stripper sleeve, the inlets of the nozzles being connected to a suitable source of compressed air (not shown) as by flexible conduit means (not shown).

In operation, after the mold elements 15—18 have been separated from each other after a shot, the element 15 is moved laterally outwardly from the press and from beneath the other elements into such position that it is exposed to receive the stripper member 19. Then the elevator carrying the stripper member is lowered to first cause the guide pins 25 to enter into the guide sleeve 62. Then the compressed air line is opened and the plate 60 is gradually further lowered, causing the stripper sleeves to enter between the cores and their carried molded articles A. The air is deflected outwardly by the top ends of the cores so that it passes, under pressure, beneath the bottom end edges of the stripper sleeves and against the upper end portions of the articles A. As the stripper sleeves are thus gradually further lowered, the air first loosens the adjacent area of adhesion of the article to the core and the stripper sleeves then pass downwardly inside the articles as shown in Figs. 7 and 8. It is my preference that the stripper sleeves not pass over the entire length of the cores and thereby the nozzles are made of a length to provide a stop for further movement of the stripper sleeves when they engage the top ends of the cores. When the guide sleeves reach the position of Fig. 8 the molded articles are constricted about the major portion of the stripper sleeves so that when the elevator is raised to move the stripper sleeves upwardly away from the cores, said sleeves carry with them the molded articles when they have freed from the cores and the articles may be readily manually removed from the stripper sleeves.

During the described operation of using the air to release the articles from the cores, the air tends to cool the articles sufficiently to allow their molecular structure to become such as to give adequate strength to the article, thus insuring that they will not be damaged due to removal from the cores.

As removed from the stripper sleeves, each of the molded articles A specifically described appears as shown in Fig. 9, with the projections B projecting inwardly from the inner surface of the article. Since in use the projections should project radially from the exterior of the article, it is necessary to turn the articles inside out as shown in Fig. 10.

I claim:

1. In apparatus for stripping a rubber-like molded article from the core element of a mold, a sleeve shaped in cross-section to conform to the exterior surface of said core element, means for inserting said sleeve axially between the periphery of said core element and an article molded thereon, and means in the sleeve for discharging fluid under pressure therein during said insertion.

2. In apparatus for stripping a rubber-like molded article from the core element of a mold, a sleeve element shaped in cross-section to conform to the exterior surface of said core element, means normally supporting said sleeve element coaxial with and in spaced relation to said core element, means operative to effect axial movement of one of said elements axially towards and relative to the other to cause insertion of said sleeve element between the periphery of said core element and an article molded thereon, and means for discharging fluid under pressure within said sleeve during said movement.

3. The apparatus of claim 2 wherein said sleeve element presents a relatively sharp end edge towards said core element.

VOLNEY S. ANDERSON.

References Cited in the file of this patent

UNITED STATES PATENTS

| Number | Name | Date |
|--------|------|------|
| 1,535,368 | MacAleese | Apr. 28, 1925 |
| 1,567,007 | Raiche | Dec. 22, 1925 |
| 1,745,827 | Ashton | Feb. 4, 1930 |
| 1,872,327 | Patten | Aug. 16, 1932 |
| 1,916,361 | Curtiss | July 4, 1933 |
| 2,025,030 | Ford | Dec. 24, 1935 |
| 2,072,349 | Wayne | Mar. 2, 1937 |
| 2,254,233 | Meyer | Sept. 2, 1941 |
| 2,334,841 | Raiche | Nov. 23, 1943 |
| 2,508,204 | Weber et al. | May 16, 1950 |
| 2,531,540 | Smith | Nov. 28, 1950 |
| 2,568,128 | Morris | Sept. 18, 1951 |